United States Patent [19]

Cleveland

[11] Patent Number: 5,060,089

[45] Date of Patent: Oct. 22, 1991

[54] DATA WRITE PULSE COMPENSATOR CIRCUIT

[75] Inventor: Brian G. Cleveland, Boulder, Colo.

[73] Assignee: Storage Technology Corporation, Louisville, Colo.

[21] Appl. No.: 571,307

[22] Filed: Aug. 22, 1990

[51] Int. Cl.$^5$ .............................................. G11B 5/09
[52] U.S. Cl. ........................................ 360/51; 360/46
[58] Field of Search ..................... 360/46, 51, 66, 45

[56] References Cited

U.S. PATENT DOCUMENTS 4,896,337 1/1990 Bushy, Jr. .............................. 360/51
4,964,107 10/1990 Galbraith et al. ...................... 360/51

*Primary Examiner*—Vincent P. Canney
*Attorney, Agent, or Firm*—Dorr, Carson, Sloan & Peterson

[57] ABSTRACT

The data write pulse compensator circuit functions to produce an erase frequency that is greater than twice the data frequency using a single clock source to thereby improve the signal to noise ratio in the read back signal. This apparatus uses a precision delay line to produce a series of clock signals with each successively replicated clock signal being delayed a predetermined amount of time with respect to the last previously replicated clock signal. The plurality of generated and delayed clock signals is then combined by a programmable pulse synthesizer to produce a data pulse of a predetermined frequency and width. The same apparatus is also used to produce a pair of erase pulses using a different combination of the delayed replicated clock signals to produce a pulse identical in size and shape to that produced for the data frequency. However, the erase pulses are time shifted such that their apparent frequency is greater than twice the data frequency.

13 Claims, 2 Drawing Sheets

DATA WRITE PULSE COMPENSATOR CIRCUIT

FIELD OF THE INVENTION

This invention relates to data storage subsystems and, in particular, to a data write pulse compensator circuit which produces precisely generated write and erase pulses for application through the write head to the magnetic media.

PROBLEM

It is a problem in data storage subsystems to effectively erase previously written data contained on the magnetic media. In magnetic tape data storage subsystems an erase head is frequently used in conjunction with the write head to erase previously written data contained on the magnetic tape in order to enable the write head to simply write the data to be stored on the magnetic tape. The use of the two heads effectively erases all previous flux reversals on the magnetic tape and increases the signal to noise ratio in the read back data signal by eliminating residual magnetization from data previously written on the magnetic tape. The difficulty with this arrangement is that it requires two separate heads in order to write data on the magnetic tape.

An alternative to the use of two heads for writing data on the magnetic tape is the use of a single write head which either writes a data signal or an erase signal into each frame of data storage on the magnetic tape. It is desirable in this arrangement to have a precise difference between the data frequency and the erase frequency to thereby maximize the resolution of the read back data signal. In such an arrangement, it is typical to use an erase frequency that is exactly double the data frequency since a single clock source and common pulse generation circuitry can be utilized. The difficulty with selecting an erase frequency that is exactly double the data frequency is that the resolution is reduced and therefore the signal to noise ratio in the read back data signal is less than desirable.

SOLUTION

The above described problems are solved and a technical advance achieved in the art by the data write pulse compensator circuit which functions to produce an erase frequency that is greater than twice the data frequency, using a single clock source, to thereby improve the signal to noise ratio in the read back data signal. This apparatus produces both an erase frequency and a data frequency using a single clock source and a precision delay line. The precision delay line produces a series of replicated clock signals, with each successively replicated clock signal being delayed a predetermined amount of time with respect to the last previously replicated clock signal. The plurality of generated and delayed clock signals is then combined by a programmable pulse synthesizer in a manner that produces a data pulse of predetermined frequency and width. The same apparatus is also used to produce a pair of erase pulses. The erase pulses are generated using a different combination of the delayed replicated clock signals to produce pulses identical in size and shape to that produced for the data frequency. However, the second erase pulse is time shifted such that its apparent frequency is greater than twice the data frequency. This frequency shift is accomplished by writing an erase signal in a single frame that consists of two erase pulses where the second erase pulse is time shifted to be closer to the first erase pulse than half the frame period. By skewing the second erase pulse in this manner, the effective frequency of the resultant erase signal is increased to thereby increase the resolution of the read back data signal.

DETAILED DESCRIPTION

Figure 1:
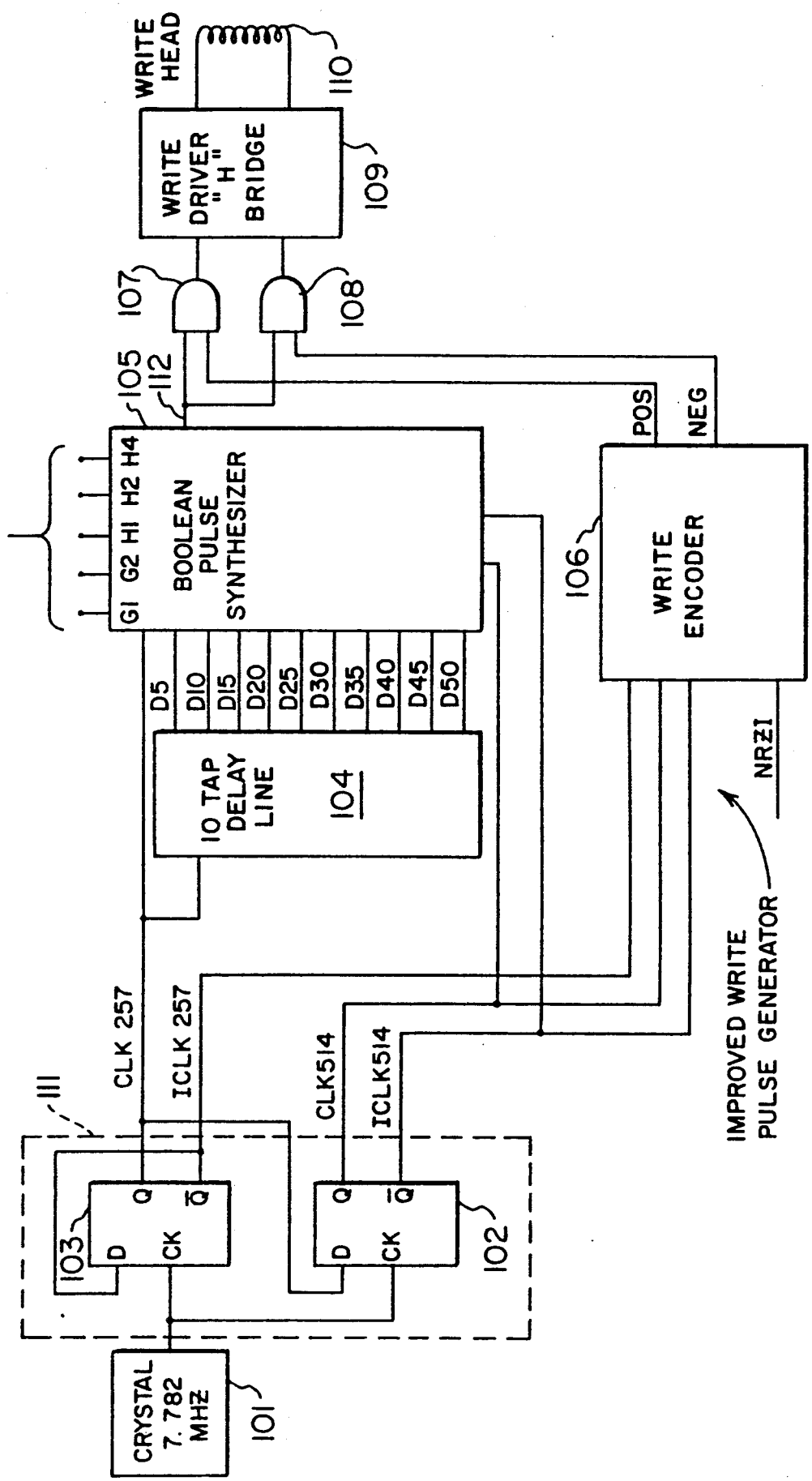
FIG. 1 illustrates the data write pulse compensator circuit in block diagram form.

The data write pulse compensator circuit is illustrated in block diagram form in FIG. 1. A reference clock circuit 101 produces a reference clock signal which is output to frequency count down circuit 111 which functions to produce two output clock signals, one of which (CLK514) is double the period of the other (CLK257). One clock signal (CLK257) is input to a delay line 104 which replicates the clock signal CLK257 at its outputs (D5-D50), wherein each replicated clock signal (D*) is delayed with respect to the last generated clock signal by a predetermined amount. The plurality of sequentially delayed clock signals (D5-D50) is applied to a pulse synthesizer circuit 105 which provides a programmable combination capability to combine the plurality of delayed clock signals (D5-D50) in a predetermined manner to generate a drive pulse which is output on lead 112. The drive pulse is applied to AND gates 107 and 108, each of which drives a different input on write driver bridge circuit 109. Write head 110 is connected to write driver bridge circuit 109 and gate 107 provides a write current in a first direction to write head 110 while gate 108 provides a write current in the reverse direction to write head 110. Write encoder circuit 106 activates a selected one of gates 107, 108 depending on the positive and negative nature of the write pulse that is to be produced. Write encoder 106 is responsive to a data input on lead NRZI to enable gates 107 and 108 to output either a data signal consisting of a single data pulse or an erase signal consisting of a pair of erase pulses into write head 110, as determined by the data input on lead NRZI.

Frequency Generation Circuit

Figure 2:
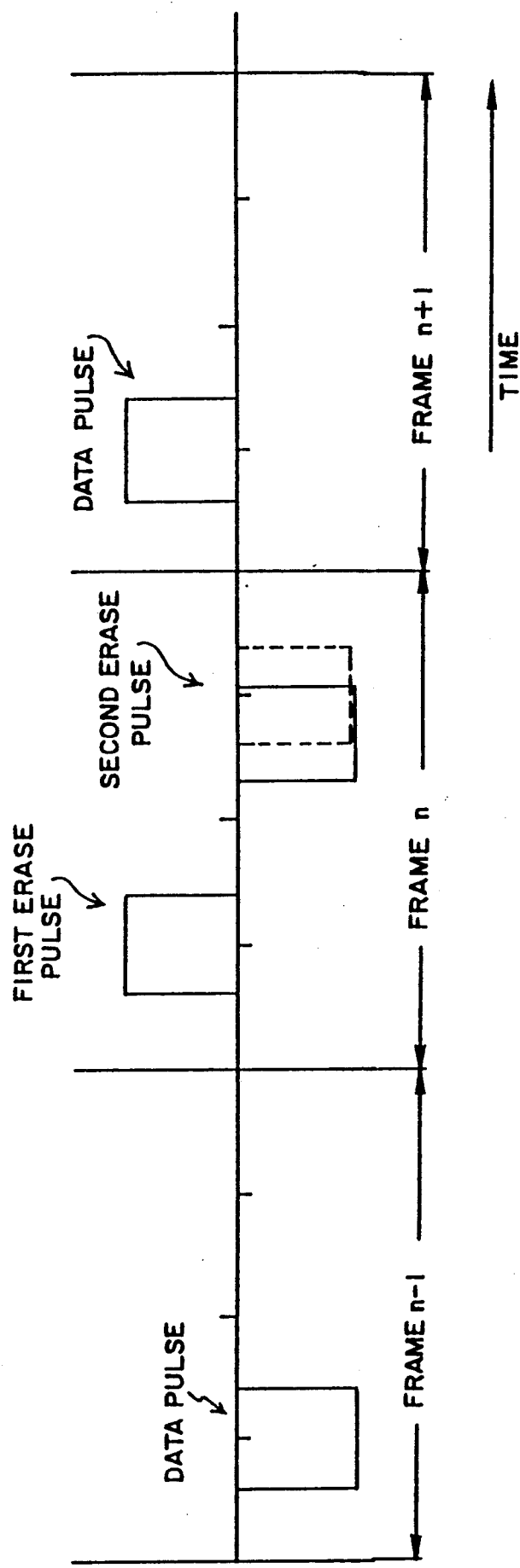
FIG. 2 illustrates a waveform diagram of the output signal from the data write pulse compensator circuit.

The reference clock 101 is implemented in this circuit by use of a crystal oscillator which produces a clock signal of predetermined frequency (ex. −7.782 MHZ). This clock signal is applied to flip flops 102 and 103 of frequency count down circuit 111 to thereby produce reference clock pulses at frequency 2F (CLK257) and frequency 1F (CLK514). The use of these two flip flops and the single reference clock produces clock pulses of precise duration, 128 nanoseconds for example. For writing data on a magnetic tape, the data window or data frame interval has a period of 514 nanoseconds. During this frame interval, either a single data pulse is written therein or two erase pulses are written onto the magnetic tape. In order to enable data read circuitry to easily distinguish between the data pulses and erase pulses, the data pulse and first erase pulse are written into the first half of the data frame while the second erase pulse is typically written in the second half of the data frame as shown in FIG. 2. The determination of whether a single data pulse or two erase pulses should be written on the magnetic tape is performed by write encoder circuit 106 in response to data received on input lead NRZI. Write encoder circuit 106 also receives as an input the clock signals CLK257 and CLK514 from flip flops 102, 103 in order to enable the synchronization of the enable signals to gates 107 and 108 with the generation of the corresponding pulses by pulse synthesizer circuit 105.

Waveform Generation

The data write and erase pulses are illustrated in the waveform diagram of FIG. 2. In order to effective frequency of the erase pulses, the first erase pulse is output during the first half of the data frame interval while the second erase pulse is output during the second half of the data frame interval but time shifted to be closer to the first erase pulse of this data frame interval than the data pulse of the subsequent data frame interval. The time shift is illustrated in FIG. 2 as a dotted line representation of the time location of the second erase pulse if it were exactly double the frequency of the data pulses. Therefore, the appearance of two pulses in close proximity, as illustrated in FIG. 2, presents an effective frequency to the write head 110 that is significantly higher than simply using erase pulses that are double the frequency of the data write pulse. The pulses produced by the data write pulse compensator circuit are of precise width and spacing as controlled by the delay line 104 and pulse synthesizer circuit 105.

In operation, delay line 104 is a multiple output delay line and, in the embodiment shown in FIG. 1, is a ten tap delay line. A clock pulse is input to delay line 104 and, in response thereto, the clock pulse is output therefrom as a series of identical clock pulses, one at each of the ten taps (D5-D50) of the delay line, with the replicated clock pulse for each successive output (ex D25) on the delay line appearing a predetermined time delay (ex 5 nsec) after the last previously output clock pulse (ex D20). Therefore, if the delay line 104 is of uniform delay between all the taps (D5-D50) therein, ten replicated clock pulses are output therefrom with each clock pulse being equally spaced from the adjacent clock pulses. If the delay line 104 has predetermined but non-uniform time delays between adjacent taps, then the clock pulses output therefrom appear at differing time intervals, with each time interval being determined in precise fashion by the delay created by the delay line 104.

In the preferred embodiment, the delay line 104 is of uniform construction wherein each of the successive taps (D5-D50) on the delay line introduces a predetermined and equal delay (5 nsec) to the clock pulse that is propagated through the delay line 104. Therefore, ten clock pulses are output from delay line 104 and applied to pulse synthesizer circuit 105. The ten replicated clock pulses output by delay line 104 are combined as defined by the programmable inputs of pulse synthesizer 105. In particular, pulse synthesizer 105 is realized by a programmable logic device (such as that produced by Advanced Micro Devices, module no. 22V10) which functions to combine the ten replicated clock pulses in synchronization with the clock signals CLK257, CLK514 obtained from flip flops 103, 102, respectively.

Pulse Synthesizer

The following mathematical representation of Table 1 illustrates the programming of pulse synthesizer 105 in order to combine the ten outputs (D5-D50) of delay line 104 to produce the desired data and erase pulses. In these equations, the outputs of the delay line 104 are represented by the letter D followed by a number indicative of the delay in nanoseconds introduced by delay line 104. The PW and SP terms are representative of the selected pulse width and pulse spacing, respectively which terms are defined below in tables 2 and 3.

TABLE 1

| PULSE_OUT = |
|---|
| D15*D20*D25*C514*PW0 |
| +D20*D25*C514*PW1 |
| +D25*C514*PW2 |
| +(D25+D30)*C514*PW3 |
| +(D25+D35)*C514*PW4 |
| +(D25+D40)*C514*PW5 |
| +(D25+D45)*C514*PW6 |
| +(D25+D50)*C514*PW7 |
| +(D10+D15)*/C514*SP3*PW3 |
| +(D10+D20)*/C514*SP3*PW4 |
| +(D10+D25)*/C514*SP3*PW5 |
| +(D10+D30)*/C514*SP3*PW6 |
| +(D10+D35)*/C514*SP3*PW7 |
| +D15*D20*D25*/C514*SP0*PW0 |
| +D20*D25*/C514*SP0*PW1 |
| +D25*/C514*SP0*PW2 |
| +(D25+D30)*C514*SP0*PW3 |
| +(D25+D35)*/C514*SP0*PW4 |
| +(D25+D40)*/C514*SP0*PW5 |
| +D10*D15*D20*/C514*SP1*PW0 |
| +D15*D20*/C514*SP1*PW1 |
| +D20*/C514*SP1*PW2 |
| +(D20+D30)*/C514*SP1*PW4 |
| +(D20+D35)*/C514*SP1*PW5 |
| +(D20+D40)*/C514*SP1*PW6 |
| +(D20+D45)*/C514*SP1*PW7 |
| +(D25+D50)*/C514*SP0*PW7 |
| +(D25+D45)*/C514*SP0*PW6 |
| +D5*D10*D15*/C514*SP2*PW0 |
| +D10*D15*/C514*SP2*PW1 |
| +D15*/C514*SP2*PW2 |
| +(D15+D20)*/C514*SP2*PW3 |
| +(D15+D25)*/C514*SP2*PW4 |
| +(D15+D30)*/C514*SP2*PW5 |
| +(D15+D35)*/C514*SP2*PW6 |
| +(D15+D40)*/C514*SP2*PW7 |
| +D0*D5*D10*/C514*SP3*PW0 |
| +D5*D10*/C514*SP3*PW1 |
| +D10*/C514*SP3*PW2 |

TABLE 2

| INPUTS | OUTPUT PULSE WIDTH |
|---|---|
| PW0 = '(/H4*/H2*/H1)' | ;118 NS |
| PW1 = '(/H4*/H2*H1)' | ;123 |
| PW2 = '(/H4*H2*/H1)' | ;128 |
| PW3 = '(/H4*H2*H1)' | ;133 |
| PW4 = '(H4*/H2*/H1)' | ;138 |
| PW5 = '(H4*/H2*H1)' | ;143 |
| PW6 = '(H4*H2*/H1)' | ;148 |
| PW7 = '(H4*H2*H1)' | ;148 |

TABLE 3

| INPUTS | PULSE SPACING SELECTION |
|---|---|
| SP0 = '(/G2*/G1)' | ;257 NS |
| SP1 = '(/G2*G1)' | ;252 NS |
| SP2 = '(G2*/G1)' | ;248 NS |
| SP3 = '(G2*G1)' | ;243 NS |

Therefore, by selecting the appropriate programmable inputs (G1, G2, H1, H2, H4) on pulse synthesizer 105, pulses of precisely defined pulse width and precisely defined pulse spacing are output by pulse synthesizer 105 on lead 112. In this preferred embodiment, as noted above the data window or data frame period is 514 nanoseconds. Exactly doubling the frequency of the write data pulse to produce a data erase pulse pair results in a pulse spacing of 257 nanoseconds. To increase the effective frequency of the data erase pulses, the spacing between the first and second pulses produced by pulse synthesizer 105 is reduced by using pulse spacing SP1, SP2 or SP3. The second erase pulse is therefore time shifted closer to the first erase pulse than for exact doubling of the data write pulse frequency with the spacing of 257 nanoseconds. These two pulses are automatically produced by pulse synthesizer 105 which is a free running circuit. Pulse synthesizer 105 thereby produces both of these pulses for each data frame, whether required or not.

Write Encoder

Write encoder 106 operates in response to the input data on lead NRZI to determine whether a data write pulse or a pair of erase pulses should be output to write head 110 via write driver bridge 109. Write encoder 106 also determines the polarity of the pulse necessary to be transmitted to write head 110. Write encoder 106 is illustrated in further detail in Table 4 below. Write encoder 106 is a programmable logic array (such as that produced by Advanced Micro Devices, module no. 20RA1O) which functions to decode logic signals from Non-Return-TO Zero, Increment (NRZI) data to produce the masking signals on leads POS, NEG to enable the proper polarity of write current to energize write head 110.

TABLE 4

Define Equations: ("+" = exclusive or)

| | |
|---|---|
| SFT1 | =NRZI |
| SFT1.CLKF | =CLK514 |
| SFT2 | =SFT1 |
| SFT2.CLKF | =CLK514 |
| ONES | =SFT1 "+" SFT2 |
| ONES.CLKF | =CLK514 |
| POL | =(ONES*/CLK514) "+" POL |
| POL.CLKF | =/CLK257 |
| DIS | =ONES*/CLK514 |
| DIS.CLKF | =/CLK257 |
| POS | =POL*DIS |
| POS.CLKF | =/CLK257 |
| NEG | =/POL*DIS |
| NEG.CLKF | =/CLK257 |

Therefore, delay line 104 and pulse synthesizer 105 produce a data pulse or two erase pulses for each data frame while write encoder 106 gates these pulses, as defined by the input data on lead NRZI, to either gate 107 or 108 to drive write head 110 with the proper polarity signal.

While a specific embodiment of this invention has been disclosed, it is expected that those skilled in the art can and will design alternate embodiments of this invention that fall within the scope of the appended claims.

I claim:

1. A pulse compensator circuit responsive to a clock signal for generating a succession of write head drive pulses of predetermined frequency to write data on a magnetic recording media via an associated write head, where said write head drive pulses are generated in synchronization with a data write frame frequency, comprising:

means responsive to said clock signal for generating a series of pulses, with each successively generated pulse in said series of pulses being delayed a predetermined amount of time with respect to the last previously generated pulse in said series of pulses;

means for combining a predetermined plurality of said pulses in said series of pulses to produce at least two write head drive pulses, each of precisely determined width and time spacing apart; and means responsive to said combining means for transmitting said write head drive pulses to said write head.

2. The apparatus of claim 1 wherein said generating means comprises an n tap delay line, where n is a positive integer greater than 1, for replicating said clock signal n times, where each successive replicated clock signal is delayed a predetermined amount of time with respect to the last previously replicated clock signal.

3. The apparatus of claim 1 wherein said combining means comprises a programmable logic array for logically combining said series of pulses.

4. The apparatus of claim 2 wherein said combining means comprises a programmable logic array for logically combining said delayed replicated clock signals.

5. The apparatus of claim 1 wherein said combining means comprises:

first means for combining a first predetermined plurality of said pulses in said series of pulses to produce a first of said write head drive pulses at a precise clock frequency;

second means for combining a second predetermined plurality of said pulses in said series of pulses to produce a second of said write head drive pulses at said precise clock frequency and time shifted such that said second write head drive pulse is closer in time to said first write head drive pulse than to a generated first write head drive pulse in the next successive data frame.

6. A pulse compensator circuit responsive to a clock signal for generating write head drive pulses of predetermined frequency to write data on a magnetic recording media via an associated write head, where said write head drive pulses are generated in synchronization with a data write frame frequency, comprising:

means responsive to said clock signal for generating a series of pulses, with each successively generated pulse in said series of pulses being delayed a predetermined amount of time with respect to the last previously generated pulse in said series of pulses;

means for combining a predetermined plurality of said pulses in said series of pulses to produce a first write head drive pulse of precisely determined width;

means for combining a predetermined plurality of said pulses in said series of pulses to produce a second write head drive pulse of precisely determined width and delayed in time with respect to said first write head drive pulse;

means responsive to said combining means for transmitting either said first write head drive pulse or both said first and said second write head drive pulses to said write head as a function of said data.

7. The apparatus of claim 6 wherein said combining means delays said second write head drive pulse less than one half the time between successive data write frames.

8. The apparatus of claim 6 wherein said generating means comprises an n tap delay line, where n is a positive integer greater than for replicating said clock signal n times, where each successive replicated clock signal is delayed a predetermined amount of time with respect to the last previously replicated clock signal.

9. The apparatus of claim 6 wherein said combining means comprises a programmable logic array for logically combining said series of pulses.

10. The apparatus of claim 8 wherein said combining means comprises a programmable logic array for logically combining said delayed replicated clock signals.

11. In a pulse compensator circuit responsive to a clock signal, a method of generating a succession of write head drive pulses of predetermined frequency to write data on a magnetic recording media via an associated write head, where said write head drive pulses are generated in synchronization with a data write frame frequency, comprising the steps of:

generating, in response to said clock signal, a series of pulses, with each successively generated pulse in said series of pulses being delayed a predetermined amount of time with respect to the last previously generated pulse in said series of pulses;

combining a predetermined plurality of said pulses in said series of pulses to produce at least two write head drive pulses of precisely determined width and spacing in time; and transmitting said write head drive pulses to said write head.

12. The method of claim 11 wherein said step of combining comprises the steps of:

firstly combining a first predetermined plurality of said pulses in said series of pulses to produce a first said write head drive pulse at a precise clock frequency;

secondly combining a second predetermined plurality of said pulses in said series of pulses to produce a second said write head drive pulse at said precise clock frequency and time shifted such that said second write head drive pulse is closer in time to said first write head drive pulse than to a generated first write head drive pulse in the next successive data frame.

13. In a pulse compensator circuit responsive to a clock signal, a method of generating write head drive pulses of predetermined frequency to write data on a magnetic recording media via an associated write head, where said write head drive pulses are generated in synchronization with a data write frame frequency, comprising the steps of:

generating, in response to said clock signal, a series of pulses, with each successively generated pulse in said series of pulses being delayed a predetermined amount of time with respect to the last previously generated pulse in said series of pulses;

combining a predetermined plurality of said pulses in said series of pulses to produce a first write head drive pulse of precisely determined width;

combining a predetermined plurality of said pulses in said series of pulses to produce a second write head drive pulse of precisely determined width delayed in time with respect to said first write head drive pulse;

transmitting either said first write head drive pulse or both said first and second write head drive pulses to said write head as a function of said data.

* * * * *